No. 635,512. Patented Oct. 24, 1899.
T. H. SAVERY.
PIPE JOINT FOR HOLLOW REVOLVING JOURNALS.
(Application filed July 1, 1898.)
(No Model.)

Attest:
J. F. Kehoe
J. A. Travers

Inventor:
Thomas H. Savery.
By Philipp, Phelps & Sawyer,
Attys.

THE NORRIS PETERS CO., PHOTO-LITHO., WASHINGTON, D. C.

UNITED STATES PATENT OFFICE.

THOMAS H. SAVERY, OF WILMINGTON, DELAWARE.

PIPE-JOINT FOR HOLLOW REVOLVING JOURNALS.

SPECIFICATION forming part of Letters Patent No. 635,512, dated October 24, 1899.

Application filed July 1, 1898. Serial No. 684,940. (No model.)

*To all whom it may concern:*

Be it known that I, THOMAS H. SAVERY, a citizen of the United States, residing at Wilmington, county of New Castle, and State of Delaware, have invented certain new and useful Improvements in Pipe-Joints for Hollow Revolving Journals, fully described and represented in the following specification and the accompanying drawings, forming a part of the same.

The object of the present invention is to provide an improved metallic steam-pipe joint for revolving drums, such as are used in drying and bleaching paper-stock, although the invention may be applied also in apparatus of other classes having hollow journals through which steam or other aeriform fluid is to be passed.

My especial object is to provide an efficient construction by which the escape of steam through the joint in case of excessive pressure in the drum shall be assured, while at the same time securing a tight joint under the desired operating conditions and a free movement of the revolving member.

A further object is to provide a convenient means for adjusting the tension of the springs, which are preferably used to control the joint, and means for indicating accurately the amount of tension.

As a full understanding of the invention can best be given by a detailed description of a construction embodying the invention, such a description will now be given in connection with the accompanying drawings, showing my improvements as applied in their preferred form in connection with a drum or cylinder in which steam is used for drying purposes, and the features forming the invention will then be specifically pointed out in the claims.

Figure 1:
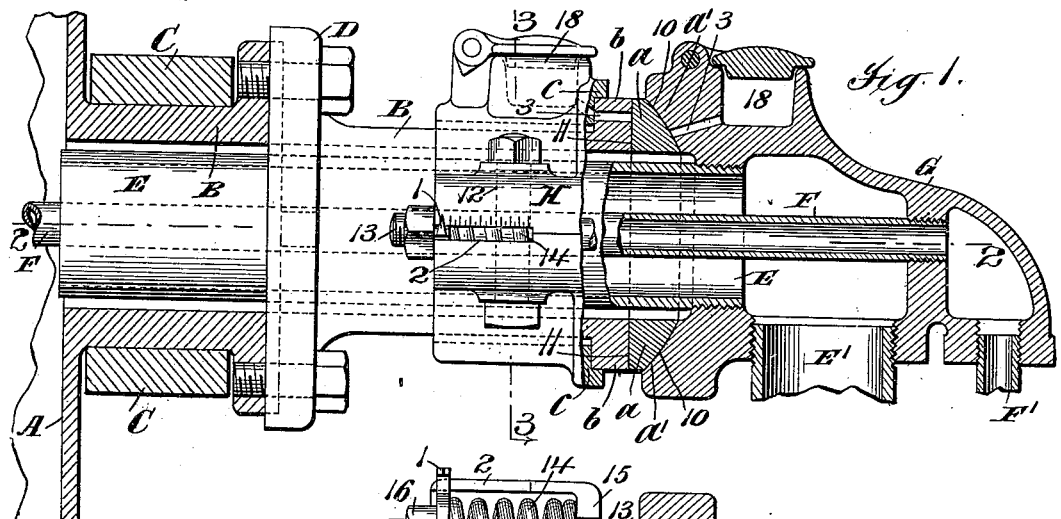
Figure 2:
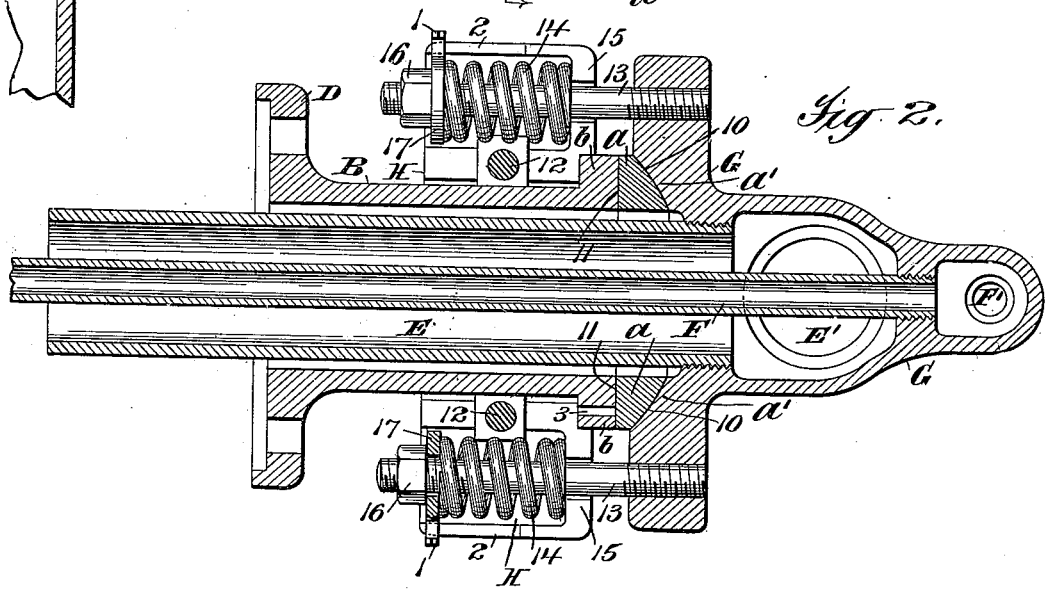
Figure 3:
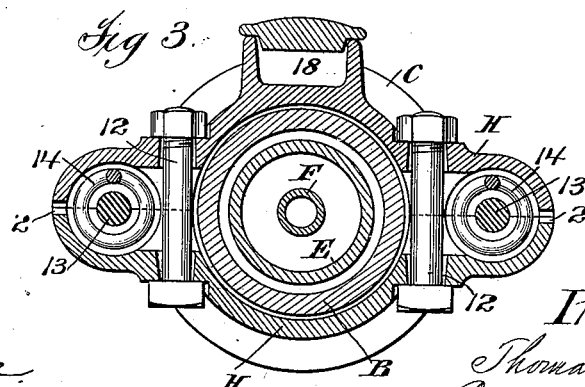

In the drawings, Figure 1 is an end view of a portion of an apparatus having my improved pipe-joint, the joint being shown in section. Fig. 2 is a horizontal section on the line 2 of Fig. 1. Fig. 3 is a cross-section on line 3 of Fig. 1.

A is the drum, having the hollow journal B, rotating in bearings C, and having an extension outside the bearing, which is shown as formed separately from the portion of the journal cast with the drum and secured thereto by a flange D. Through the hollow journal B extend steam-pipe E and drain-pipe F, which are carried by a stationary support G, having chambers connecting with the pipes E F and inlet and outlet steam and drain pipes E' F', as common in this class of driers.

The support G forms a stationary abutment for the hollow journal and is provided next the journal with a valve-seat $a'$, which is preferably spherical in form, as shown, and within this valve-seat is an annular steam-valve $a$, having a similarly-curved surface engaging the valve-seat $a'$ and preferably having a plain vertical surface on its opposite side, where it engages a similar surface on the outer end of the hollow journal B, two joints 10 11 thus being formed between the hollow journal B and the pipe-support G. This valve $a$ is loose—that is, it is not secured to either the hollow journal B or the pipe support or abutment G, but is simply an annular loose valve placed between the end of the journal and the abutment and is preferably made of brass, so as to secure durability with reduction of friction opposing the movement of the revolving journal B, although it may be of any other suitable material.

For the purpose of holding the journal B pressed outward relatively to the cylinder and against the valve $a$, so as to close the joints 10 11 against the escape of steam under the desired running conditions, the journal B is provided with an end flange or shoulder $b$, which is engaged by a bearing-flange $c$ on a collar H, which is shown as formed in halves, secured together about the journal B by bolts 12. This collar is carried by bolts 13, secured in the pipe-support G, the collar being loose on the bolts 13, so as to be adjustable thereon longitudinally of the journal B for the means of securing the desired pressure upon the valve $a$ between the journal B and the support G, while held by the bolts from revolving with the journal.

The collar H is spring-pressed toward the support G, so as to press the journal B outward relatively to the cylinder and toward the latter under a yielding pressure by springs 14, surrounding bolts 13, these springs being located in chambers formed by the collar and bearing against the end walls of the chambers 15 and adjustable by nuts 16 on bolts 13. Washers 17 are preferably used between the nuts and springs, and these washers are preferably provided with pointers 1, as shown, which project through slots 2 to the outside of the chambers containing the springs and move upon scales on the outside of the collar, so that the pressure put upon the springs 14, and thus upon the valve $a$ by the nuts 16, is indicated on the scales, and the pressure may thus readily be adjusted as desired, according to the amount of steam-pressure to be carried in the drum. The support G and collar H are provided with oil-cups 18, through which oil passes through oil-ducts 3 to respectively the joints 10 11 between the valve $a$ and the support G and journal B. It will be seen that with this construction, in case of excessive pressure in the drum through any cause, the springs 14 will yield and permit the escape of steam through the joints 10 11 or one of them, and greater certainty in this safety action of the valve is secured by the two joints, while at the same time the friction opposing the movement of the journal B is largely reduced by the use of the loose valve $a$. By the adjustment of the springs 14 just the desired pressure upon the valve $a$ and a corresponding limit of the pressure in the drum may be secured in accordance with the steam-pressure to be carried in the drum, and the joints 10 11 thus be closed steam-tight under the pressure for which the springs are adjusted, while permitting the escape of steam under a higher pressure.

While the valve is preferably constructed and arranged, as shown, with a spherical or other curved surface, so as to allow some sidewise play between the journal B and the stationary pipe-support G and to compensate for wear, it will be understood that the invention is not limited to such a construction, but that an annular valve may be used without such a curved surface and corresponding valve-seat, both sides of the valve being straight, or that the curved surface and valve-seat may be arranged otherwise than as shown, the valve being provided with a curved surface upon either or both sides. The construction shown, however, has been found very efficient in practice and is preferably used.

While the loose annular valve is an important feature in the construction and probably the best results are thus secured, the other parts of the construction shown may be used without this loose valve, the joint then being formed between the end of the hollow journal and support G, and the invention includes certain features that may be embodied in such a construction.

What I claim is—

1. The combination with a hollow revolving journal, of a stationary abutment, a loose annular valve between the journal or extension thereof and the abutment, and means for pressing the journal and abutment together under yielding pressure, substantially as described.

2. The combination with a hollow revolving journal, of a stationary abutment, a loose annular valve between the journal or extension thereof and the abutment, one or more springs for pressing the journal and abutment together, and means for adjusting the tension of said springs, substantially as described.

3. The combination with a hollow revolving journal, of a stationary abutment, a collar loose on said journal or extension thereof and arranged to press the journal toward the abutment, means for adjusting the collar toward the abutment, and a loose annular valve between the journal and abutment, substantially as described.

4. The combination with a hollow revolving journal, of a stationary abutment, a collar loose on said journal or extension thereof and spring-pressed toward the abutment, said collar being arranged to press the journal toward the abutment, and a loose annular valve between the journal and abutment, substantially as described.

5. The combination with a hollow revolving journal, of a stationary abutment, a collar loose on said journal or extension thereof, springs pressing said collar toward the abutment, said collar being arranged to press the journal toward the abutment, means for adjusting the tension of the springs, and a loose annular valve between the journal and abutment, substantially as described.

6. The combination with a hollow revolving journal, of a stationary abutment, and a collar loose on said journal or extension thereof and spring-pressed toward the abutment and arranged to press the journal outward toward the abutment to form a steam or similar joint, substantially as described.

7. The combination with a hollow revolving journal, of a stationary abutment, a collar loose on said journal or extension thereof, springs pressing said collar toward the abutment, said collar being arranged to press the journal outward toward the abutment to form a steam or similar joint, and means for adjusting the tension of the springs, substantially as described.

8. The combination with a stationary pipe-support, as G, of a hollow revolving journal, divided collar H loose on said journal or extension thereof, bearing-shoulders $b$, $c$ on the journal and collar, supporting-rods 13 for the collar, and springs 14 on said rods pressing the collar toward the pipe-support, substantially as described.

9. The combination with a stationary pipe-support, as G, of a hollow revolving journal, divided collar H loose on said journal or extension thereof, bearing-shoulders $b$, $c$ on the journal and collar, supporting-rods 13 for the collar, springs 14 on said rods pressing the collar toward the pipe-support, and means for adjusting the tension of the springs, substantially as described.

10. The combination with a hollow revolving journal, of a stationary abutment, a loose annular valve between the journal or extension thereof and the abutment, one or more springs for pressing the journal outward toward the abutment and means for adjusting the tension of said springs and indicating the amount of tension, substantially as described.

11. The combination with a hollow revolving journal, of a stationary abutment, a collar loose on said journal or extension thereof, springs pressing said collar toward the abutment, said collar being arranged to press the journal outward toward the abutment to form a steam or similar joint, and means for adjusting the tension of the springs and indicating the amount of tension, substantially as described.

12. The combination with a stationary pipe-support, as G, of a hollow revolving journal, divided collar H loose on said journal or extension thereof, bearing-shoulders $b$, $c$ on the journal and collar, supporting-rods 13 for the collar, springs 14 on said rods pressing the collar toward the pipe-support, and means for adjusting the tension of the springs and indicating the amount of tension, substantially as described.

In testimony whereof I have hereunto set my hand in the presence of two subscribing witnesses.

THOMAS H. SAVERY.

Witnesses:
G. M. BORST,
T. F. KEHOE.